US011412889B2

(12) United States Patent
White

(10) Patent No.: US 11,412,889 B2
(45) Date of Patent: Aug. 16, 2022

(54) COLLAPSIBLE GRILL

(71) Applicant: Gregory White, Cardington, OH (US)

(72) Inventor: Gregory White, Cardington, OH (US)

( * ) Notice: Subject to any disclaimer, the term of this patent is extended or adjusted under 35 U.S.C. 154(b) by 414 days.

(21) Appl. No.: 16/565,657

(22) Filed: Sep. 10, 2019

(65) Prior Publication Data

US 2020/0077840 A1  Mar. 12, 2020

Related U.S. Application Data

(60) Provisional application No. 62/728,930, filed on Sep. 10, 2018.

(51) Int. Cl.
*A47J 37/07* (2006.01)
*A47J 33/00* (2006.01)
*F24B 1/20* (2006.01)

(52) U.S. Cl.
CPC .......... *A47J 37/0763* (2013.01); *A47J 33/00* (2013.01); *F24B 1/205* (2013.01)

(58) Field of Classification Search
CPC .............. A47J 37/0763; A47J 33/00; A47J 2037/0795; F24B 1/205
See application file for complete search history.

(56) References Cited

U.S. PATENT DOCUMENTS

| | | | | |
|---|---|---|---|---|
| 2,604,884 A | * | 7/1952 | Walker | A47J 37/0772 126/30 |
| 3,395,692 A | * | 8/1968 | Mansel | A47J 37/0763 126/30 |
| 3,688,757 A | | 9/1972 | Dusek | |
| 3,719,181 A | * | 3/1973 | Porter | A47J 37/0763 126/30 |
| 3,834,370 A | * | 9/1974 | Nelson | F24B 1/182 126/506 |
| 4,363,313 A | * | 12/1982 | Smith | A47J 37/0763 126/9 R |
| 4,569,327 A | | 2/1986 | Velten | |
| 4,622,945 A | * | 11/1986 | Glitten | A47J 33/00 126/25 A |
| 4,766,879 A | * | 8/1988 | Freese | A47J 37/0772 126/25 A |
| 7,013,885 B2 | | 3/2006 | Czajkoski | |
| 7,445,004 B1 | | 11/2008 | Milner et al. | |
| 8,544,459 B2 | | 10/2013 | Rees | |
| 9,010,312 B1 | | 4/2015 | Rinderle | |
| 9,877,611 B2 | * | 1/2018 | Andol | A47J 37/0763 |
| 10,779,680 B2 | * | 9/2020 | Jordan | A47J 37/0745 |

* cited by examiner

*Primary Examiner* — Alfred Basichas
(74) *Attorney, Agent, or Firm* — Boudwin Intellectual Property; Daniel Boudwin

(57) ABSTRACT

A collapsible grill. The collapsible grill includes a base. The base is defined by several walls. An interior cavity is formed by the walls. A rod is affixed to an external surface of the base and extends upward from the base. A platform is mounted onto the rod. The platform can be adjusted vertically on the rod, so that a user can set a desired distance between the platform and the base.

19 Claims, 5 Drawing Sheets

COLLAPSIBLE GRILL

CROSS REFERENCE TO RELATED APPLICATIONS

This application claims the benefit of U.S. Provisional Application No. 62/728,930 filed on Sep. 10, 2018. The above identified patent application is herein incorporated by reference in its entirety to provide continuity of disclosure.

BACKGROUND OF THE INVENTION

The present invention relates to a collapsible grill. More specifically, the present invention provides a collapsible grill that allows for the user to vertically adjust the positioning of the cooking surface.

Many individuals find themselves in situations where they must prepare a meal for themselves or other people in a place that lacks a kitchen. For example, campers, fishermen, hunters, hikers, beachgoers or other outdoor recreation enthusiasts, may be in a campsite, beach, trail, park or similar location where they do not have access to a stove, oven, grill or other cooking apparatus. Additionally, many of these individuals lack the ability to bring such apparatuses with them when they are engaging in outdoor recreational activities. Some cooking apparatuses are portable, such as by being smaller or by being disassembled, however, these apparatuses are typically either ineffective for properly preparing food or are difficult to set up. Difficulty setting up these apparatuses can impact the individual's overall experience and enjoyment of the recreational activities that they are engaged in. Additionally effective apparatuses take up space in storage, requiring individuals to apportion spaces in their homes or other structures for these devices. Therefore, there is a defined need amongst the known art for a device that is portable, easily assembled, and effective for cooking food in places where traditional food preparation devices are unavailable.

SUMMARY OF THE INVENTION

In view of the foregoing disadvantages inherent in the known types of stowable and movable grilling devices now present in the prior art, the present invention provides a collapsible grill wherein the same can be utilized for providing convenience for the user when cooking in a location that is not suitable for a traditional grilling device.

The present system comprises a base. The base is defined by a plurality of walls. An interior cavity is defined by the base, between the plurality of walls. The plurality of walls defines an external surface on each wall of the plurality of walls. A rod is disposed on the external surface of the base, extending upward therefrom. A platform is movably disposed upon the rod, above the base.

It is a further object of the present invention to provide a crank, wherein the crank is configured to move the platform vertically up and down the rod. As such, the user may adjust the level of heat applied to the platform.

It is another object of the present invention to provide a cable in operable connection at a first end with the crank and at a second end with the platform. As such, the cable links the platform to the crank, such as to enhance use of the crank.

Yet a further embodiment of the present invention provides the cable being disposed upon a spool. As such, the cable is safely and effective stored when the collapsible grill is in a folded configuration.

In another embodiment of the present invention, the platform is affixed to the rod via an elevator, with or without a sliding tube. As such, the force of the stress exerted by the platform upon the rod is reduced.

It is another object of the present invention to provide a stop in operable connection with the elevator. As such the vertical position of the platform may be further supported.

In yet another embodiment, it is an object of the present invention to provide a rod that extends downward beyond a bottom surface of the base. As such, the collapsible grill may be staked into the ground to provide additional structural support to the device.

In a further embodiment, it is an object of the present invention to provide a latch disposed on a top end of the rod. As such, the platform can be folded upward and stored in a folded configuration via the latch.

In another embodiment, it is an object of the present invention to provide a pin latch system, wherein the pin latch system links the walls of the plurality of walls of the base. As such, the shape of the base is adjustable.

In a further embodiment, it is an object of the present invention to provide a handle disposed on an external surface of the base. As such, the handle can be utilized to move the collapsible grill.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
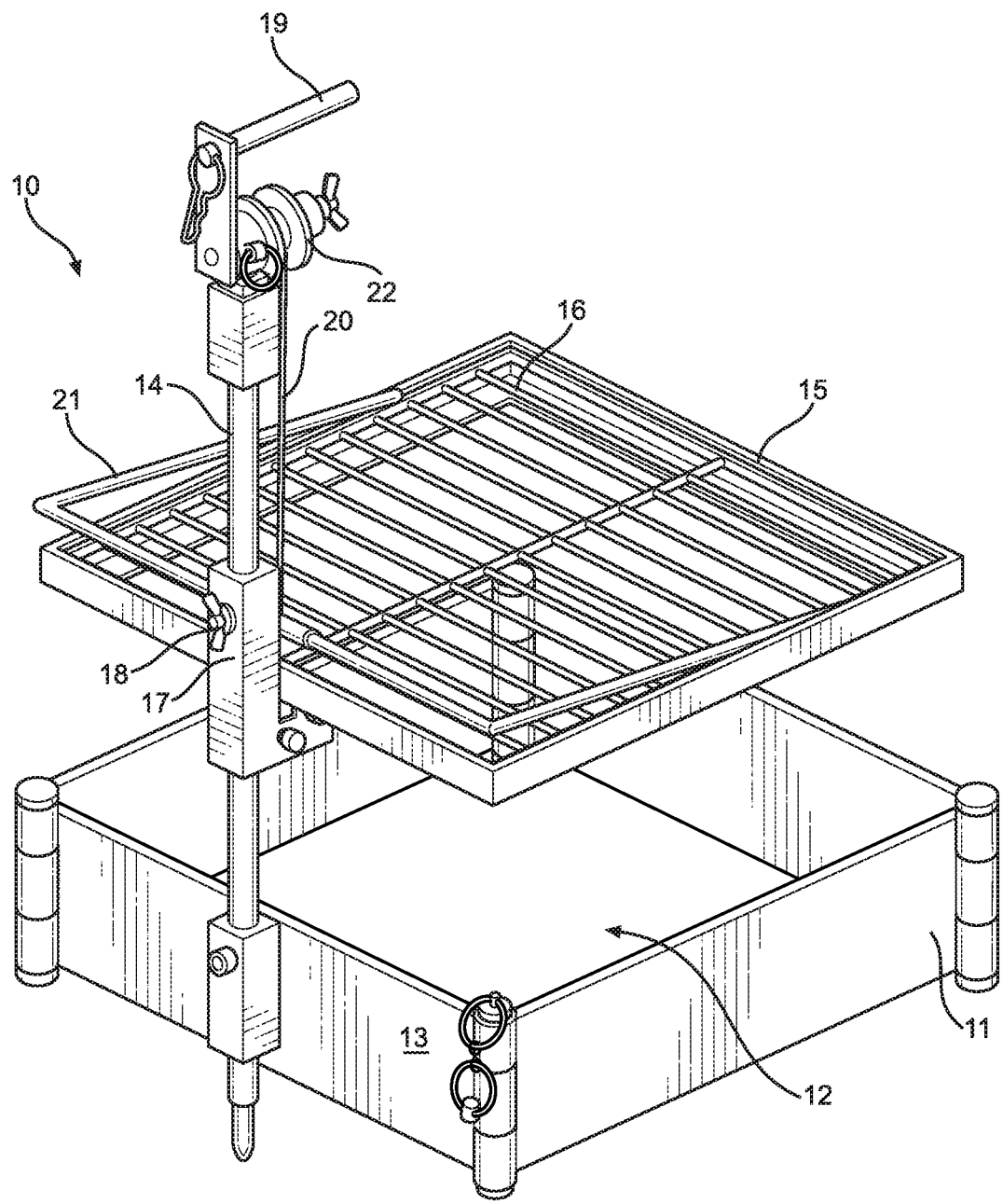
FIG. 1 shows a perspective rear view of an embodiment of the collapsible grill.

Reference is made herein to the attached drawings. Like reference numerals are used throughout the drawings to depict like or similar elements of the collapsible grill. The figures are intended for representative purposes only and should not be considered to be limiting in any respect.

Referring now to FIG. 1, there is shown a perspective rear view of an embodiment of the collapsible grill. The collapsible grill 10 comprises a base. The base is defined by a plurality of walls 11. The plurality of walls 11 are positioned such as to form a perimeter around an interior cavity 12. The interior cavity 12 is dimensioned such that a heat source can be placed therein. The heat source may be of any suitable configuration or structure for creating heat at a level capable of cooking food products. For example, the heat source may be a wood-powered, camp-style fire or charcoal powered, grill-style fire. The plurality of walls 11 are constructed of a material that is both rigid and heat resistant. In the illustrated embodiment, there are four walls 11 that form a base in the shape of a square.

A rod 14 is affixed to an external surface 13 of one of the plurality of walls 11 which define the base. The rod 14 extends upward from the base, such that components can be disposed upon the rod 14 without being directly subjected to the heat source disposed in the interior cavity 12. As shown, when arranged for use, the rod 14 is disposed perpendicularly to the plurality of walls 11 which define the base.

A platform 15 is movably disposed upon the rod 14 above the base. The platform 15 comprises a frame with a cooking surface 16 defined by the frame. In the illustrated embodiment, the cooking surface 16 is a grate. In other embodiments, the cooking surface 16 may be a grill or a skillet. The cooking surface 16 is composed of a food safe material, such as stainless steel, such as to allow the safe and effective cooking of food upon the cooking surface 16.

Furthermore, in the illustrated embodiment, the platform 15 is affixed to the rod 14 via an elevator 17. The elevator 17 is configured to vertically position the platform 15 at a location upon the rod 14. In the illustrated embodiment, the elevator 17 comprises a sliding tube. The sliding tube defines the interface between the elevator 17 and the rod 14. As shown, the sliding tube is formed entirely around the rod 14, such that support is pressure is exerted around the entirety of the rod 14 as contacted by the sliding tube. In the illustrated embodiment, the sliding tube comprises a stop 18. The stop 18 is configured to secure the vertical position of the platform upon the rod 14.

In the illustrated embodiment, a crank 19 is in operable connection with the platform 15. Specifically, the crank 19 is in operable connection with the platform 15 via a cable 20. As shown, the cable 20 extends from a spool 22 that is attached to the crank 19, such that when the crank is turned in a first direction, the cable 20 is wrapped around the spool 22 in such a way that decreases the length of the cable 20 between the spool 22 and the platform 15. Additionally, as shown, the cable 20 is attached to a platform brace 21. The platform brace 21 is attached to the platform 15 at a middle point of the platform 15. As such, force generated by the crank 19 upon the cable 20 is dispersed among the entire platform 15 instead of just the edge of the platform 15.

Figure 2:
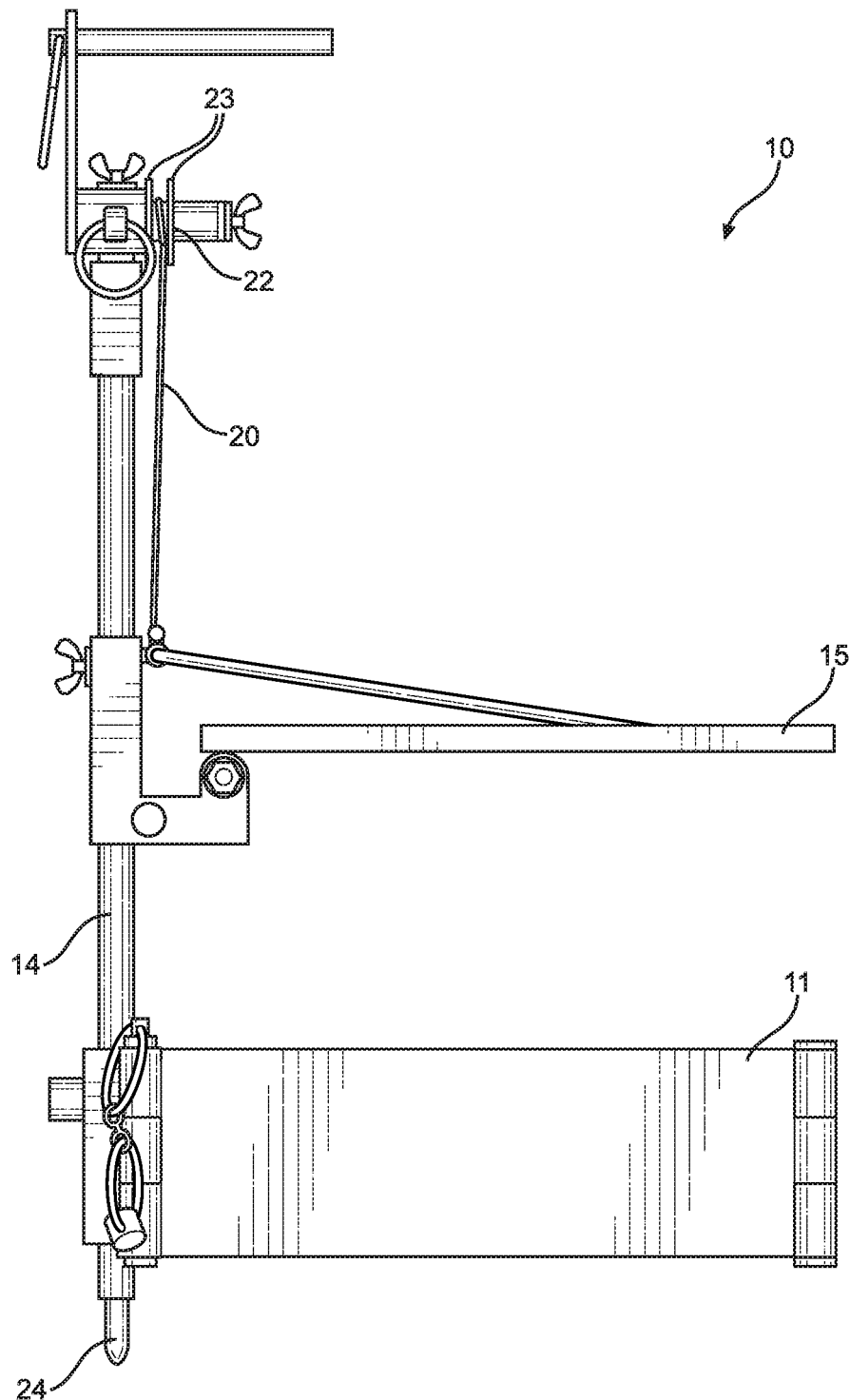
FIG. 2 shows a side view of an embodiment of the collapsible grill in a deployed configuration.

Referring now to FIG. 2, there is shown a side view of an embodiment of the collapsible grill in a deployed configuration. As illustrated, the deployed position is defined where the platform 15 is parallel or substantially parallel, to the base defined by the plurality of walls 11. When in the deployed position, food products can be cooked upon the platform 15. As such, the platform 15 should be even with the heating source such that the food products are cooked evenly.

In the illustrated embodiment, the spool 22 is defined by a pair of washers 23 disposed on opposing ends thereof. The pair of washers 23 are configured to define an area in which the cable 20 is contained. As such, the distance between the pair of washers 23 is great enough that the cable 20 can be contained therebetween when the collapsible grill 10 is in the deployed position. In the illustrated embodiment, the pair of washers 23 are of an identical shape and perimeter.

As shown in the illustrated embodiment, a bottom end 24 of the rod 14 may extend downward beyond the plurality of walls 11 that defines the base. As such, the bottom end 24 of the rod 14 may be inserted into the ground in order to provide additional stability to the collapsible grill 10 when deployed for use. In the illustrated embodiment, the bottom end 24 of the rod 14 comprises a rounded point. As such, the bottom end 24 of the rod 14 will be able to more effectively penetrate the ground surface upon which the collapsible grill 10 is placed.

Figure 3:
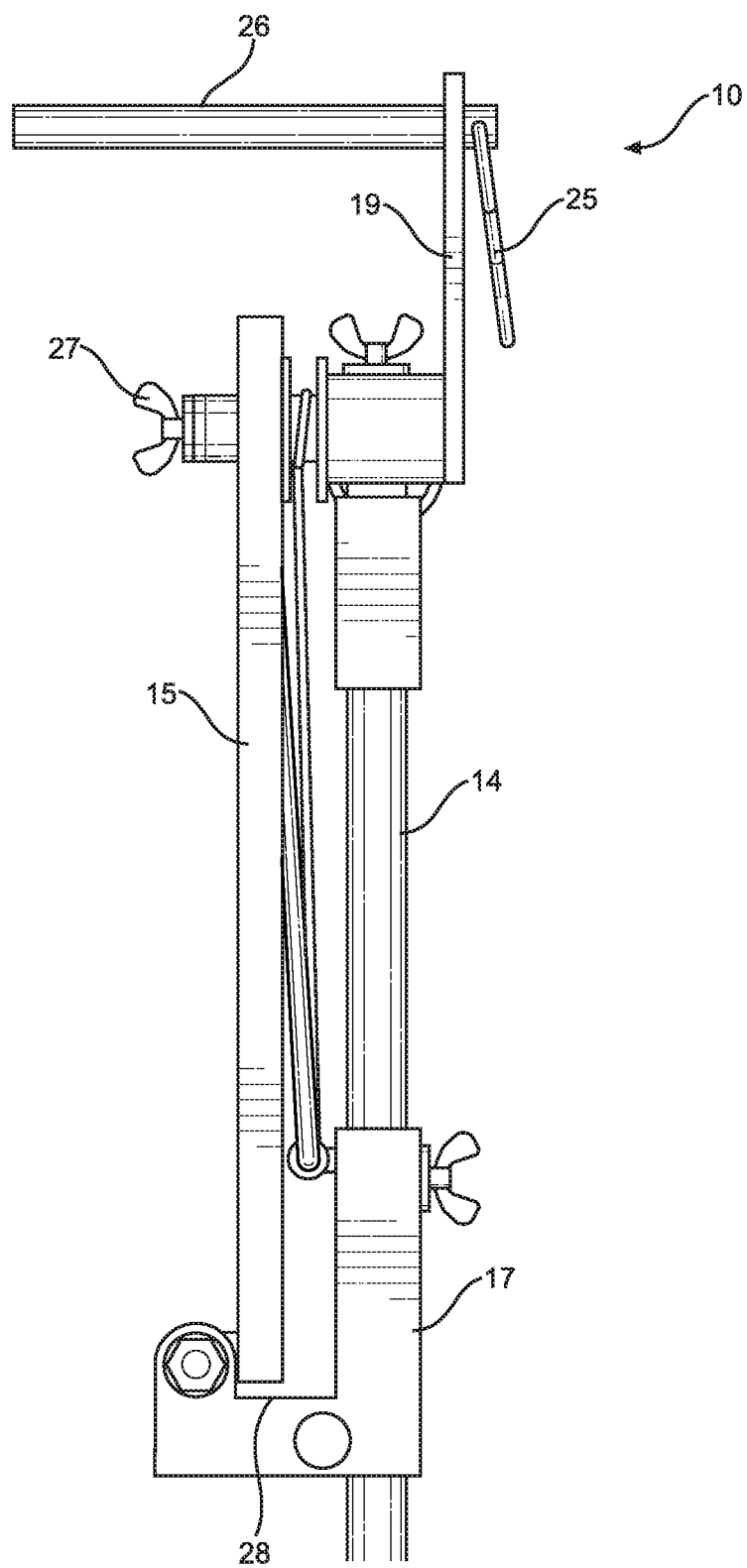
FIG. 3 shows a side view of an embodiment of the collapsible grill in a folded configuration.

Referring now to FIG. 3, there is shown a side view of an embodiment of the collapsible grill in a folded configuration. As illustrated, the folded configuration is defined where the platform 15 is parallel to (or substantially parallel to) the rod 14. In the illustrated embodiment, the collapsible grill 10 further comprises a latch 27. The latch 27 is disposed toward the top end of the rod 14. The latch 27 is configured to hold the platform 15 in a folded configuration. As such, when a user s storing the collapsible grill, the platform 15 will be prevented from freely moving around.

In the illustrated embodiment, the crank 19 comprises a crank handle 26. The crank handle 26 is perpendicularly affixed to the crank 19, such that the user can engage the crank handle 26 to actuate the crank 19. In the illustrated embodiment the crank handle 26 is removably affixed to the crank 19, such that the side of the crank 19 on which the crank handle 26 is disposed can be changed. As shown, in such an embodiment the crank handle 26 may comprises a crank handle clasp 25. The crank handle clasp 25 is configured to secure the crank handle 26 to the crank 19.

As demonstrated in the illustrated embodiment, the elevator 17 is shaped so as to provide a channel 28. The channel 28 must be of a length greater than the width of the platform 15. As such, the channel 28 will provide a sufficient length for the platform 15 to rest in the folded configuration. In the illustrated embodiment, the elevator 17 is shaped such that a pair of side segments are disposed on opposite sides of the channel 28. A first side segment is shorter in height than the second side segment, the first side segment provides a hinge for the platform 15 to rest on and the second side segment is slidably engaged with the rod 14.

Figure 4:
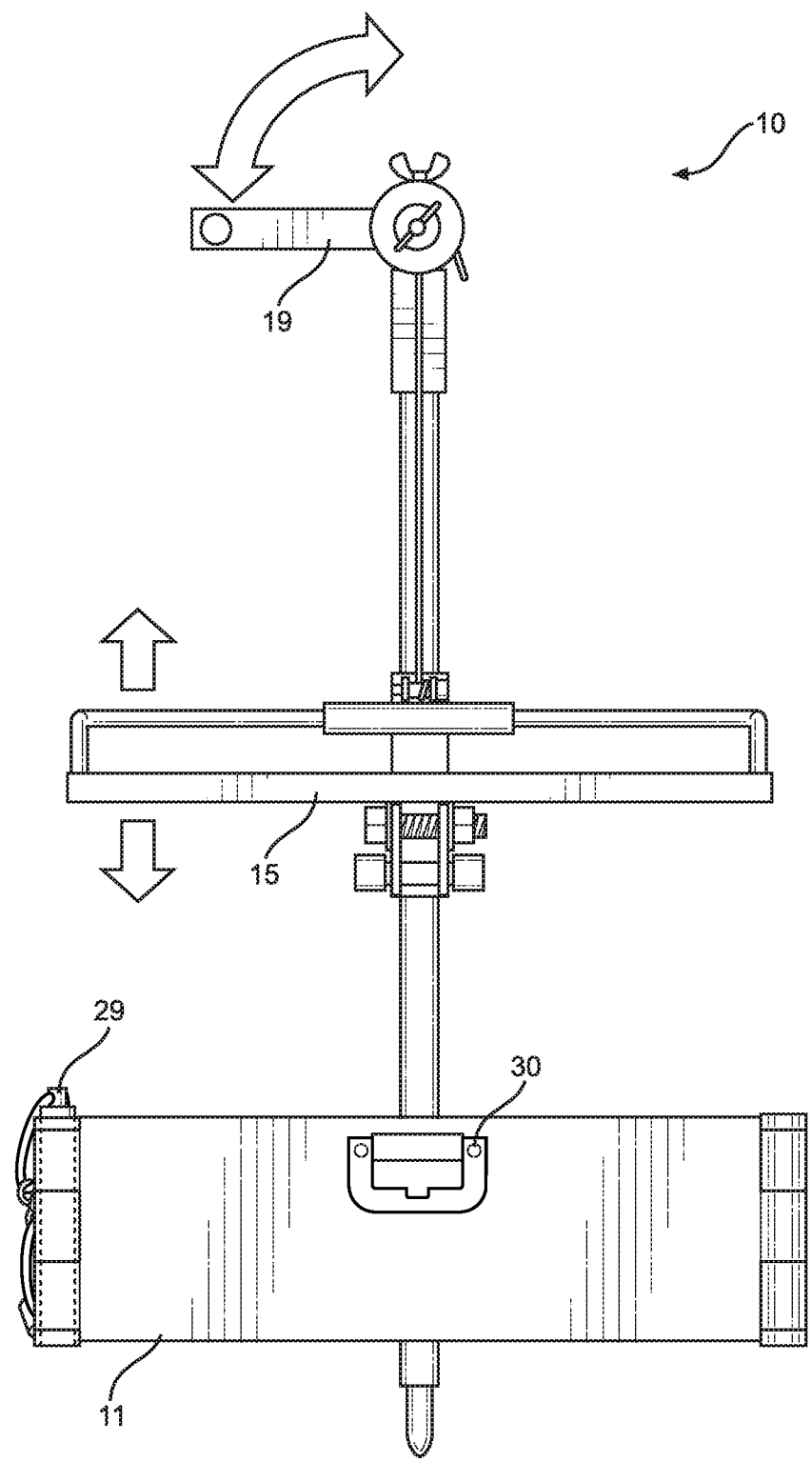
FIG. 4 shows a front view of an embodiment of the collapsible grill.

Referring now to FIG. 4, there is shown a front view of an embodiment of the collapsible grill. In use, the user will set up the plurality of walls 11 of the base upon a substantially flat surface, upon which a heat source can be placed. The heat source will be contained within the plurality of walls 11, such that the heat source is unable to spread beyond the plurality of walls 11. The user may then actuate the crank 19, such that the platform 15 is disposed at a desired height above the heat source. As such, the user has control over the temperature that is applied to the food products that are placed on the platform.

As illustrated the plurality of walls 11 are hingedly affixed together. As such, the shape of the base can be adjusted by the user in order to accommodate specific locations. In the illustrated embodiment, the plurality of walls 11 comprises a pin latch system 29. The pin latch system 29 allows the user to change the shape the base by removing a wall from or adding a wall to the plurality of walls 11. Additionally, in the illustrated embodiment, a handle 30 is disposed on an external surface of a wall of the plurality of walls 11. As such, the user may utilize the handle 30 when adjusting the plurality of walls 11 or in transporting the plurality of walls.

Figure 5:
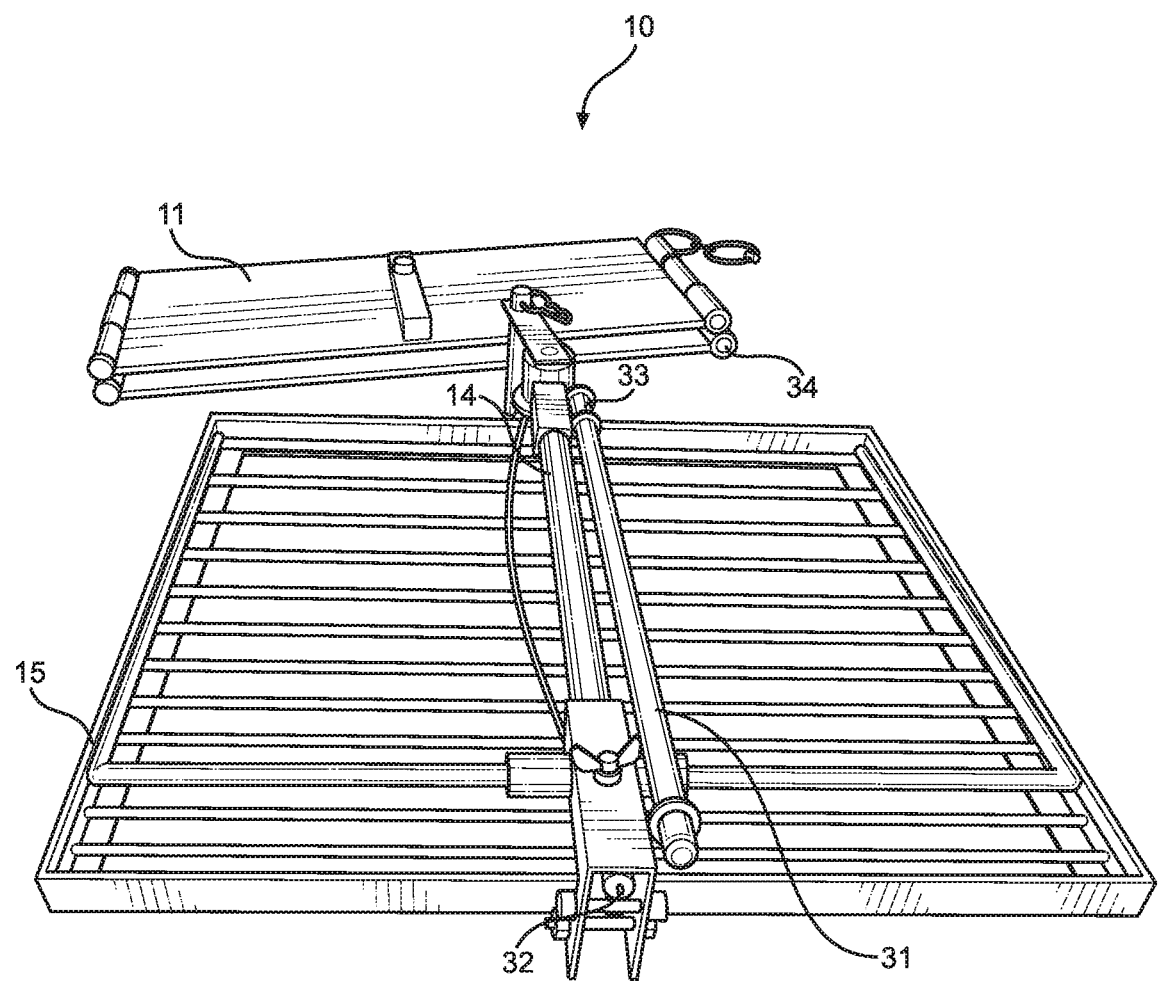
FIG. 5 shows a perspective view of an embodiment of the collapsible grill, deconstructed.

Referring now to FIG. 5, there is shown a perspective view of an embodiment of the collapsible grill, deconstructed. In the shown embodiment, the entirety of the anchor post 31 is visible. In the stowed configuration, the anchor post 31 is stored symmetrically to the rod 14, proximate to the platform 15. The anchor post is configured to slide into the rod 14 via a rod port 32 disposed on a bottom end of the rod 14, next to the platform 15. The anchor post 31 is securable upon an anchor post receptor 33. In one embodiment, the anchor post receptor 33 is spring-controlled. Additionally, in the illustrated embodiment, the plurality of walls 11 are collapsible via the action of the plurality of hinges 34. As such, the plurality of walls 11 of the base may be folded up to make them easier to store.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form function and manner of operation, assembly and use, are deemed readily apparent and obvious to one skilled in the art, and all equivalent relationships to those illustrated in the drawings and described in the specification are intended to be encompassed by the present invention.

Therefore the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A collapsible grill, comprising:
a base defined by a plurality of walls;
the base defining an interior volume between the plurality of walls;
a rod affixed to an external surface of the base, extending upward therefrom;
a platform movably disposed on the rod above the base;
wherein the platform defines a cooking surface;
wherein a latch is disposed on a top end of the rod, the latch configured to hold the platform in a folded position.

2. The collapsible grill of claim 1, further comprising a crank configured to move the platform vertically on the rod.

3. The collapsible grill of claim 2, wherein a cable is disposed between the crank and the platform.

4. The collapsible grill of claim 3, wherein the cable is disposed upon a spool, wherein the spool comprises a pair of washers disposed on opposing ends thereof.

5. The collapsible grill of claim 1, wherein the platform is affixed to the rod via an elevator.

6. The collapsible grill of claim 5, wherein the elevator is affixed to the rod via a sliding tube.

7. The collapsible grill of claim 6, wherein the sliding tube further comprises a stop, such that the vertical position of the platform may be secured.

8. The collapsible grill of claim 1, wherein a bottom end of the rod extends downward beyond the base.

9. The collapsible grill of claim 1, wherein the platform comprises a grate.

10. The collapsible grill of claim 1, wherein the sidewalls of the plurality of sidewalls are hingedly secured together.

11. The collapsible grill of claim 1, wherein the sidewalls of the plurality of sidewalls are attached via a pin latch system.

12. The collapsible grill of claim 1, wherein a handle is disposed on the external surface of the base.

13. A collapsible grill, comprising:
a base defined by a plurality of walls;
the base defining an interior volume between the plurality of walls;
a bottom end of a rod affixed to an external surface of the base, extending upward therefrom;
a crank disposed on a top end of the rod;
the crank in operable connection with a first end of a cable;
wherein the cable is disposed upon a spool, wherein the spool comprises a pair of washers disposed on opposing ends thereof;
a platform movably disposed on the rod above the base via an elevator;
wherein the platform defines a cooking surface;
a second end of the cable affixed to the elevator;
wherein the elevator is secured to the rod via a sliding tube;
wherein a latch is disposed on a top end of the rod, the latch configured to hold the platform in a folded position.

14. The collapsible grill of claim 13, wherein a bottom end of the rod extends downward beyond the base.

15. The collapsible grill of claim 13, wherein the sliding tube further comprises a stop, such that the vertical position of the platform may be secured.

16. The collapsible grill of claim 13, wherein the platform comprises a grate.

17. The collapsible grill of claim 13, wherein the sidewalls of the plurality of sidewalls are attached via a pin latch system.

18. The collapsible grill of claim 13, wherein a handle is disposed on the external surface of the base.

19. A collapsible grill, comprising:
a base defined by a first wall, a second wall, a third wall and a fourth wall;
the base defining an interior volume between each wall;
a bottom end of a rod affixed to an external surface of the second wall, extending upward therefrom;
a crank disposed on a top end of the rod;
the crank in operable connection with a first end of a cable;
wherein the cable is disposed upon a spool, wherein the spool comprises a pair of washers disposed on opposing ends thereof;
a platform movably disposed on the rod above the base via an elevator;
wherein the platform is of a perimeter that is equivalent to a perimeter of the base;
the platform defining a cooking surface;
a second end of the cable affixed to the elevator;
wherein the elevator is secured to the rod via a sliding tube;
a stop operably disposed on the sliding tube, such that the vertical position of the platform is securable;
wherein a latch is disposed on a top end of the rod, the latch configured to hold the platform in a folded position.

* * * * *